United States Patent Office 3,063,762
Patented Nov. 13, 1962

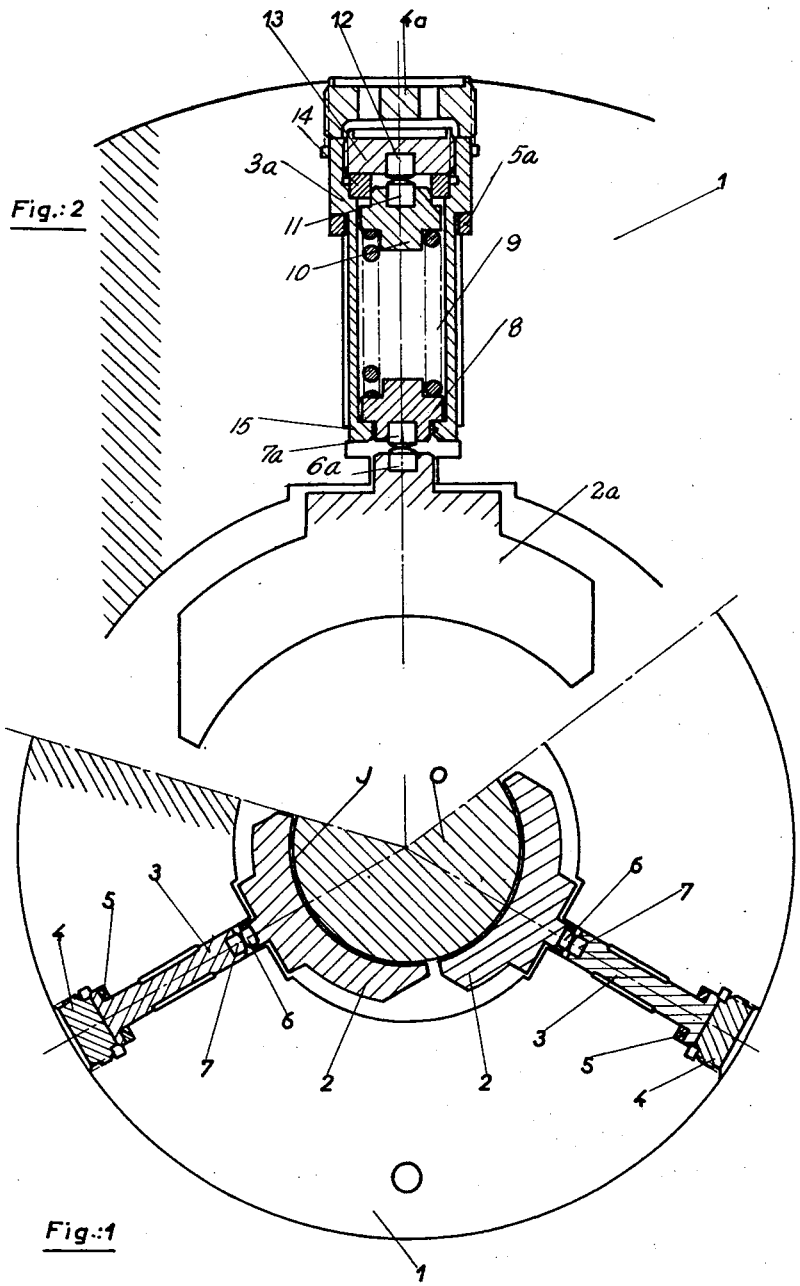

3,063,762
ROCKABLE-SHOE BEARING WITH VARIABLE
CLEARANCE AND INITIAL LOAD
Alfred Hirtz, Boulogne-sur-Seine, Seine, France, assignor to Societe Rateau, Paris, France, a company of France
Filed July 25, 1961, Ser. No. 126,569
Claims priority, application France Aug. 17, 1960
3 Claims. (Cl. 308—73)

Rotary machines which run at high rotational speeds, which are equipped with special packings and more particularly turbo-machines, require ever greater stability for the parts which are in rotational movement, in a range of speeds which may be very extensive.

The usual rockable-shoe bearings effect excellent hydrodynamic centering in a given range of circumferential speeds and for characteristic values of radial clearance, shoe dimensions and hydraulic pressure. The small amount of clearance necessary for correct operation at relatively low speeds, however, permits of unsteady running at high speeds. A small clearance also promotes thermal self locking.

The invention relates to an improvement in the usual type of bearing which enables these disadvantages to be eliminated. The invention consists in providing at least one of the shoes forming part of such a bearing, with a variable-length device which transmits to the stator the hydro-dynamic lift developed by the said shoe and which permits the radial clearance of the bearing to increase when the said lift exceeds a certain characteristic value or initial load. When the circumferential speed corresponds to a lift less than the initial load, the clearance remains fixed and the bearing behaves like a conventional bearing.

According to one particularly advantageous constructional form, which will be described hereinafter hereinafter in more detail, this device comprises a spring which bears against an abutment at low rotational speeds, whose length under load varies when the radial clearance of the bearing increases, and which transmits to the mobile shoe a reaction which increases with the said clearance; this device also comprises a hydraulic damping device constituted by the cylindrical chamber of variable length used as a housing for the spring, the variation in length causing a variation of the leakage cross-section of the liquid filling the said chamber.

The description which follows with regard to the accompanying drawings, given by way of non-limitative example, will make it easy to understand how the invention can be carried into effect, the features brought out from the description and drawings being, of course, part of the said invention.

FIGURE 1 shows a bearing comprising three rockable shoes, the two shoes situated at the lower portion being of conventional type and the shoe situated at the upper portion being provided with a device according to the invention.

FIGURE 2 shows in detail, with respect to the same axis of rotation but on twice the scale, of a slidable thrust rod containing a pre-loaded spring, acting as a damping device relatively to the upper shoe.

According to FIGURE 1, the stator 1 of the rotary machine comprises a bearing constituted, for example, of three rockable shoes 2 and 2a, which are spaced angularly from one another by about 120°. The two shoes 2 are situated at the lower portion of the bearing and each rest, by means of studs 6 made of hard metal, on a thrust rod 3 fast with the stator. The said rod 3 also comprises a stud 7 made of hard metal which is situated opposite the stud 6, and also a flange situated at the opposite end and which comes to bear against a shim 5 of suitable thickness. A screwthreaded plug 4 immobilises the assembly formed of these two parts against the stator 1, and the choice of the thickness of the shim 5 makes it possible to determine the minimum value of the operating clearance J of the shoes 2 relatively to the journal O.

The shoe 2a situated at the upper portion of the bearing differs from the two lower shoes 2 in that the stud 7a (FIG. 2) can slide towards the interior of thrust rod 3 which is hollow. This rod comprises a flange 15 retaining a mobile part 8 carrying the stud 7a; it contains a spring 9 one end of which bears against the part 8 and whose other end is fast with the stator 1. For this purpose, a part 10 receives the pressure of the spring 9 and transmits the said pressure to a screwthreaded plug 13 by means of studs of great hardness 11 and 12 which they carry respectively. The plug 13 is screwed on the rod 3a, a washer 14 being inserted between these two elements at the time of assembly. Finally, the rod 3a like the corresponding rods 3, is provided with a shim 5a and a fixing plug 4a.

This bearing operates in the following manner. In the stopped condition, the journal O rests on the lower shoes 2 with a small clearance J. When the machine rotates, the oil film between the shoes 2 and 2a on the one hand and the journal O on the other hand becomes deformed; the said shoes then pivot on the studs 7 and 7a and develop a hydrodynamic lift which becomes considerable having regard to the weight of the rotor and which causes the journal O to be centered in the shoes 2 and 2a. With increasing circumferential speed, the said lift would increase further and could, if the clearance J determined by the shims 5 and 5a remained fixed, reach such a relationship with the weight of the rotor on the one hand and the inherent damping capacity of the oil film on the other hand, that the assembly would become unstable at a certain value of the said speed. The device described hereinbefore avoids this detrimental result of speed increases by limiting the maximum value of the lift, the latter increasing to a lesser extent since the clearance J increases by displacement of the supporting part 8 and at all events remaining in the range of variation controlled by the force of the spring 9. The shoe 2a is movable, like the part 8, and it returned elastically towards the position of minimum clearance J corresponding to the bearing contact of the said part against the flange 15. The interior of the rod 3a acts as a dashpot whose leakage orifices, constituted by the radial and axial clearances of the said part 8, are variable with the clearance J.

Strictly speaking, the total variation of the clearance J remains slight, but the restoring force restoring the rotor towards the ideal centering position and the lift also vary slightly contrary to what is the case with conventional bearings. This force and also the minimum value of the clearance J and the damping of the mobile shoe are not only clearly defined but adjustable.

The initial regulation of the clearance J is effected by choosing a suitable thickness for the shim 5a.

The initial load of the spring 9 is regulated by adjusting the thickness of the washer 14 in the same way.

The damping effect depends on the loss of pressure in the leakage orifices and therefore on the form of the part 8 and of the flange 15 in their co-operating zones.

The initial clearance may be small in the stopped state, the initial load not being applied to the mobile shoe since the part 8 is in contact with the flange 15. When the shaft is driven in rotational movement, the hydrodynamic lift reaches the value of the initial load and a value of the circumferential speed which is all the smaller in proportion as the initial clearance is small also. From this value onwards, the bearing clearance increases and corresponds the equilibrium of the static (elastic) and hydrodynamic forces acting on the mobile shoe. Therefore, the journal O is displaced relatively to its initial centering position in the shoes 2 and 2a, which is itself different from its position in the stopped state. Therefore, when, determining this latter position it is necessary to take into account the clearance of the bearing but also the other parts of the machine, labyrinths, blades, etc.

An additional advantage afforded by the device according to the invention in addition to stability, resides in that the fact that the satisfactory working of the bearing is independent of the difference in temperature between the journal and the shoes, which may result from any reason whatsoever. This makes it impossible for thermal self-locking to take place, which would destroy the bearing. This advantage is particularly advantageous in the case of natural-cooling bearings (that is to say, where there is no external admission of fluid) such as gaseous-film bearings.

It will be apparent that the invention is not restricted to the form of embodiment which has been explained more particularly but that it also covers those which might be obtained by substitution of equivalent technical means.

What I claim is:

1. In combination with a rotatable shaft, a bearing with rockable shoes, supported by a stator and effective to develop hydrodynamic centering forces, comprising at least one thrust rod fixed to the said stator and used as a guide for a co-axial part which can slide in the radial direction and serves as a support for the corresponding shoe, means for restoring the said supporting part towards an abutment carried by the said rod and determining the minimum clearance of the bearing in the stopped state, and means for damping the movements of the said supporting part.

2. Bearing according to claim 1, wherein the said restoring means consist of a spring mounted in the said rod, and whose initial load can be adjusted by interposing shims of selected thickness at its fixed end opposite from the said abutment.

3. Bearing according to claim 1, wherein the said damping means are constituted by the thrust rod and the supporting part, between which there is formed a clearance of appropriate dimensions for allowing the rod to act as a dashpot.

References Cited in the file of this patent

UNITED STATES PATENTS 1,814,833     Doron     July 14, 1931